Oct. 6, 1970 G. G. HAVENS ET AL 3,532,579
APPARATUS FOR CONTINUOUSLY FORMING A TUBULAR
MEMBER OF RESIN-IMPREGNATED FIBERS
Filed April 19, 1965 6 Sheets-Sheet 1
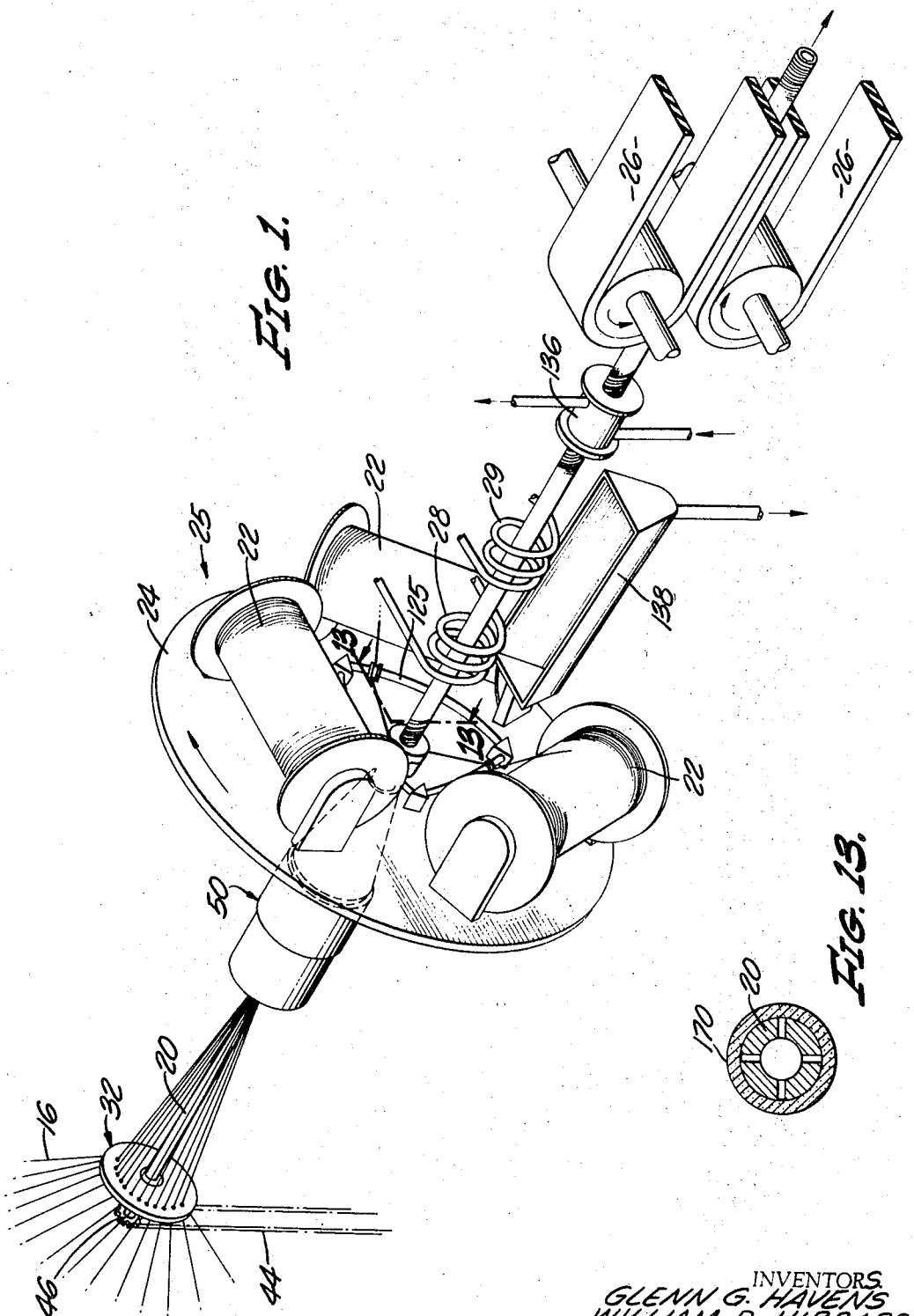
INVENTORS
GLENN G. HAVENS
WILLIAM D. HIBBARD
BY
Donald W. Cassady
ATTORNEY

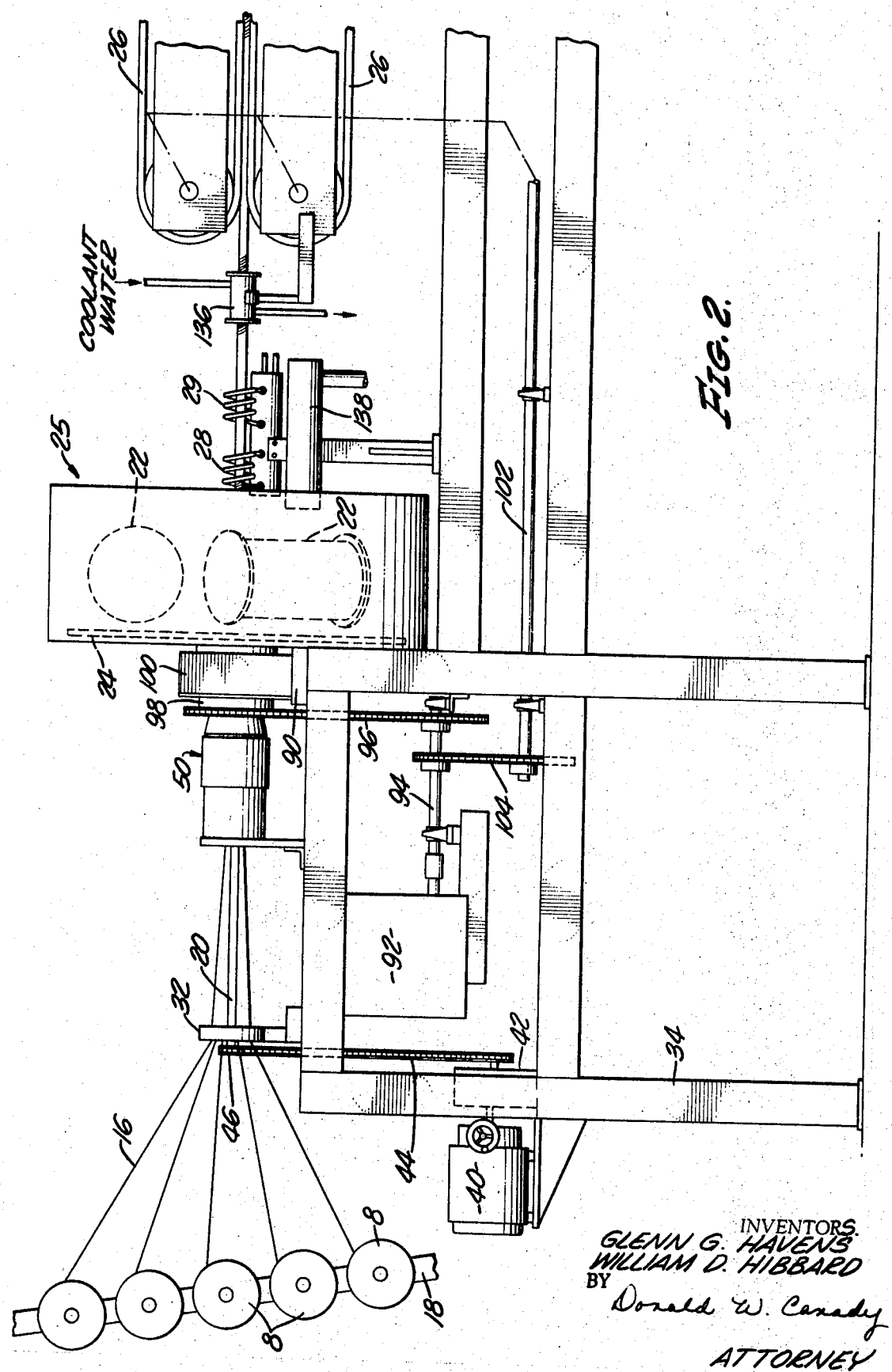

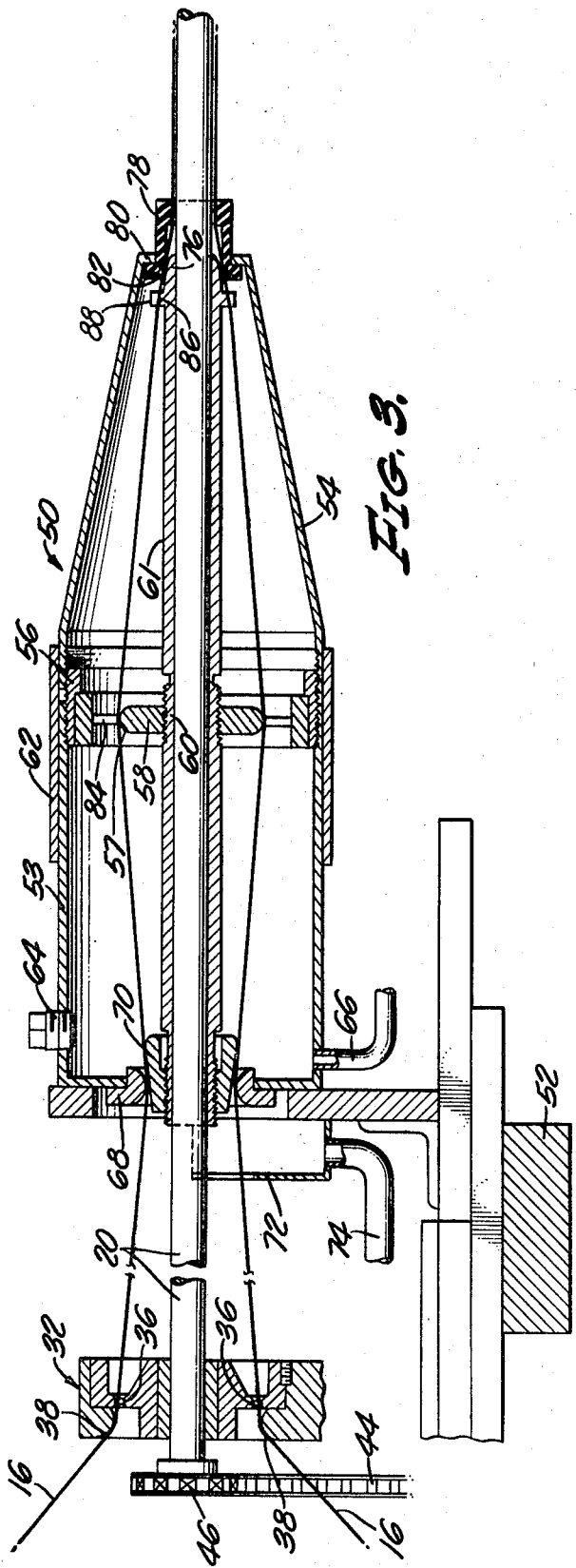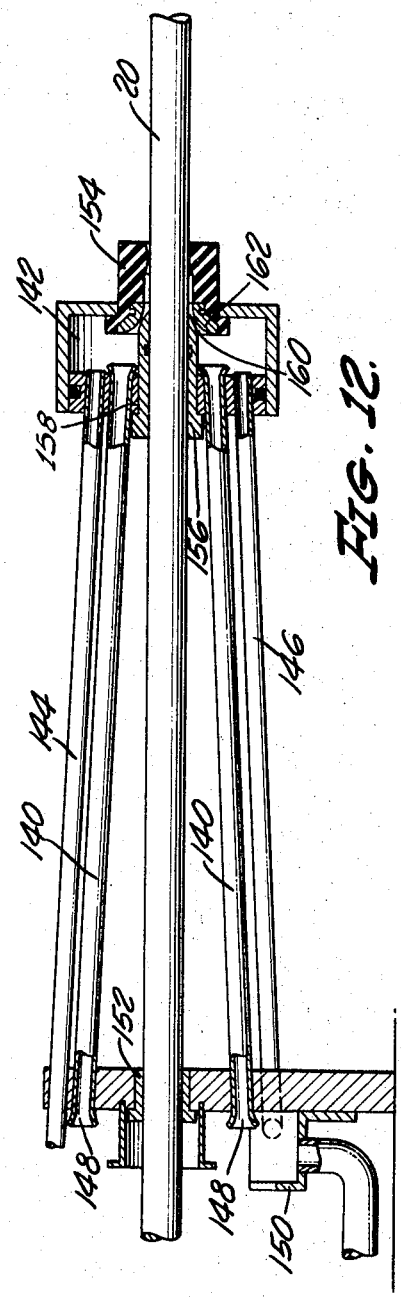

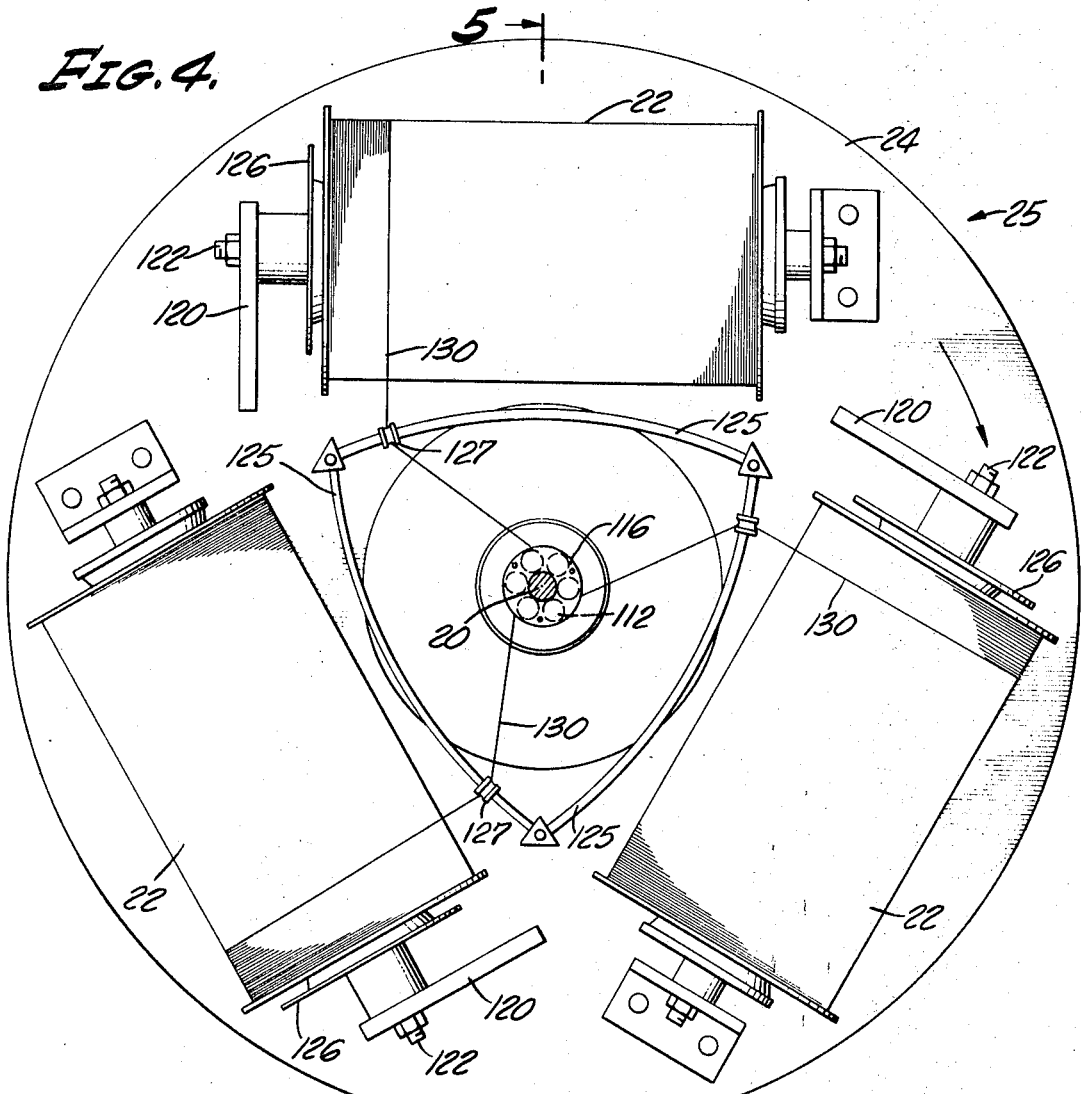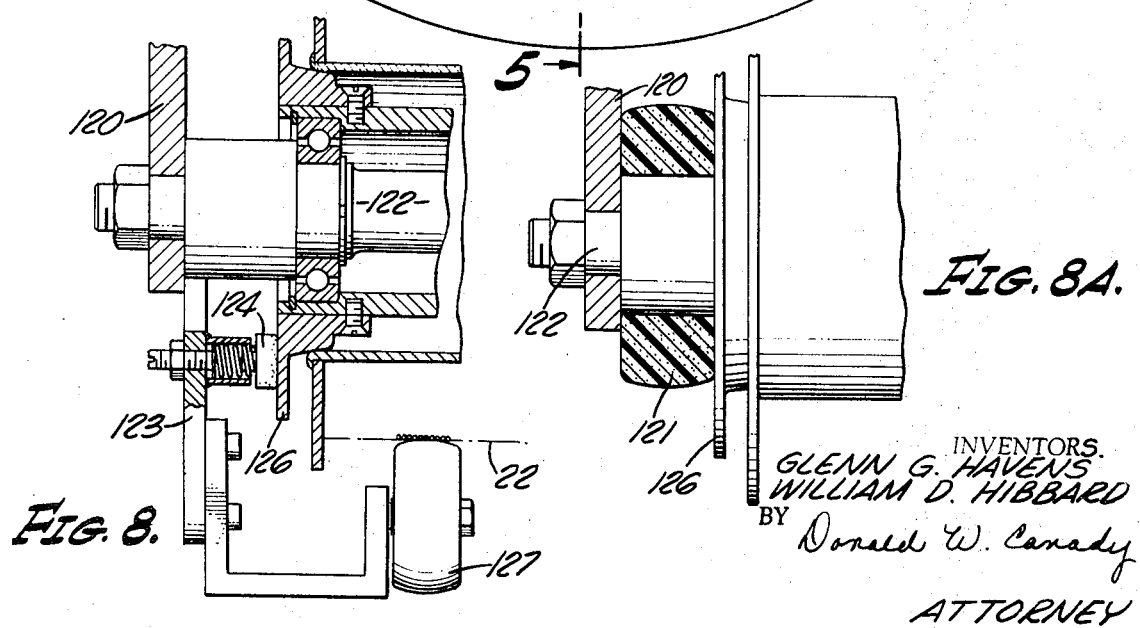

INVENTORS.
GLENN G. HAVENS
WILLIAM D. HIBBARD
BY Donald W. Canady
ATTORNEY

Oct. 6, 1970 G. G. HAVENS ETAL 3,532,579
APPARATUS FOR CONTINUOUSLY FORMING A TUBULAR
MEMBER OF RESIN-IMPREGNATED FIBERS
Filed April 19, 1965 6 Sheets-Sheet 6

INVENTORS.
GLENN G. HAVENS
WILLIAM D. HIBBARD
BY
Donald W. Canady
ATTORNEY

United States Patent Office 3,532,579
Patented Oct. 6, 1970

3,532,579
APPARATUS FOR CONTINUOUSLY FORMING A TUBULAR MEMBER OF RESIN-IMPREGNATED FIBERS
Glenn G. Havens and William D. Hibbard, San Diego, Calif., assignors, by direct and mesne assignments, to Havens International, San Diego, Calif., a corporation of California
Filed Apr. 19, 1965, Ser. No. 449,054
Int. Cl. B65h 81/00
U.S. Cl. 156—431                            1 Claim

ABSTRACT OF THE DISCLOSURE

An apparatus to form a continuous tubular member feeds a plurality of fibers through a tank containing a liquid bonding agent and then distributes the fibers impregnated with the bonding agent in a first layer longitudinally around the periphery of a mandrel. A second layer of fibers fed from spools on a plate rotating axially about the mandrel are circumferentially wrapped around the first layer of fibers with sufficient tension to effect impregnation of the second layer. A third layer of fibers may be wrapped circumferentially around the second layer of fibers if desired. The layers of fiber are then advanced through a heating section to cure the bonding agent and secure the fibers into a tubing. The tubing formed is cooled and pulled axially off the mandrel.

---

The present invention relates to a method and apparatus for continuously forming tubular members, and, more particularly, tubular members for resisting internal pressures comprising a plurality of continuous fiber or filament impregnated with a bonding agent.

The use of interlaced or woven fibers or filaments of glass or the like to produce high strength reinforced pipe and tubing is well known. However, the use of woven material renders such pipe and tubing relatively expensive and such pipe and tubing does not have optimum structural properties. The crossover point of the fibers exhibits structural weakness, and the voids at such points of intersection further reduce the strength of the article by lowering the fiber to resin ratio. Consequently, low cost pipe and tubing of optimum strength are best provided by applying endless fibers to a forming member in a continuous process, thus eliminating the seam or "crossover" point.

One of the difficulties encountered in applying such endless fibers to a forming member lies in obtaining satisfactory separation after the pipe or tubing is completely fabricated. Inasmuch as many of the fibers are circumferentially oriented, axial removal tends to delaminate or unravel the circumferential fibers, particularly with certain types of tubing where the filament windings are desirably in the "resin starved" condition to render the tubing porous. Such a tubing is more particularly set forth in copending application, Ser. No. 397,264, filed Sept. 17, 1964, now abandoned, for "Solvent Separation Process and Apparatus" of which U.S. Pat. 3,457,170 for "Solvent Separation Process and Apparatus" is a continuation-in-part. In said patent application a porous tube is disclosed which is operative to effect solvent separation by utilization of the reverse osmosis phenomenon. The tubing used in such operation is desirably porous to thus enable the tubing to pass fresh water exuding radially outward through a membrane which is formed on the inner surface of the tube. In order to form a tube having satisfactory porosity, the pores of the fiber glass tube are not completely filled with resin since complete filling would substantially eliminate the porosity in the tube. On the other hand, forming the tube in the "resin starved" condition makes it more difficult to acquire the desired bursting strength and resistance to unraveling.

Another problem involved in continuously forming a tube impregnated with resin is the tendency for the resin to cause the tube to stick to the mandrel. When the tube is continuously formed, the tubing must slide relative to the mandrel and, hence, a mold release compound cannot be utilized. The use of a lubricant to prevent sticking between the tube and the mandrel has been suggested, however, when a "resin starved" condition is present, the lubricant tends to prevent adequate bonding of the layers of wound fibers.

Accordingly, it is an object of the present invention to provide a method and apparatus for continuously producing low cost tubing by utilizing non-woven fibers or filaments suitably reinforced by a bonding agent.

It is also an object of our present invention to provide a method and apparatus for forming a resin impregnated filament wound tubular article continuously from two or more layers of continuous filaments, at least one of which is circumferentially positioned relative to said tube whereby the circumferential layer is applied under a tension sufficient to result in impregnation thereof with resin applied previously to the tube being formed.

Another object of our present invention is to provide a novel resin tank for applying a resinous bonding material to continuous filaments used to continuously form a filament wound tubular member.

Another object of our present invention is to provide a novel apparatus for applying a circumferential layer to an impregnated partially formed tubular member on an axially stationary mandrel.

A further object of our present invention is to provide a novel mandrel design for use in forming a resin impregnated tubular member wherein said tubular member is pulled along said mandrel and said resin material is cured by induction heating or dielectric as said uncured resin impregnated tube is pulled over said mandrel.

Another object of the invention is the provision of a method and apparatus for forming a resin impregnated filament wound tubular member upon an axially stationary mandrel whereby sticking between said tube and said mandrel is prevented.

It is also an object of the present invention to provide a method and apparatus for continuously forming a porous, resin-impregnated filament wound tubular member.

Another object of the present invention is to provide a method for increasing the porosity of a cured resin impregnated glass fiber tube.

Other objects and a more complete understanding of the present invention will become apparent from the following description and the appended claim when taken in conjunction with the accompanying drawings, wherein:

FIG. 1 is an isometric view of the tube winding apparatus of our present invention;

FIG. 2 is a side elevation view of the tube winding apparatus shown in FIG. 1;

FIG. 3 shows an enlarged cross sectional view of the longitudinal yarn distributor and the resin applicator tank;

FIG. 4 is an end elevation of the circumferential wrapping head shown in FIGS. 1 and 2;

FIG. 8 is a cross sectional view of the yarn tensioning apparatus shown in FIG. 7 taken on line 8—8 of FIG. 7;

FIG. 8a shows an alternate back-tensioning brake device;

FIG. 12 is a cross sectional side elevation view of a modified resin applicator and yarn distributor apparatus;

FIG. 13 is a cross sectional view of the mandrel taken on line 13—13.

Figure 5:
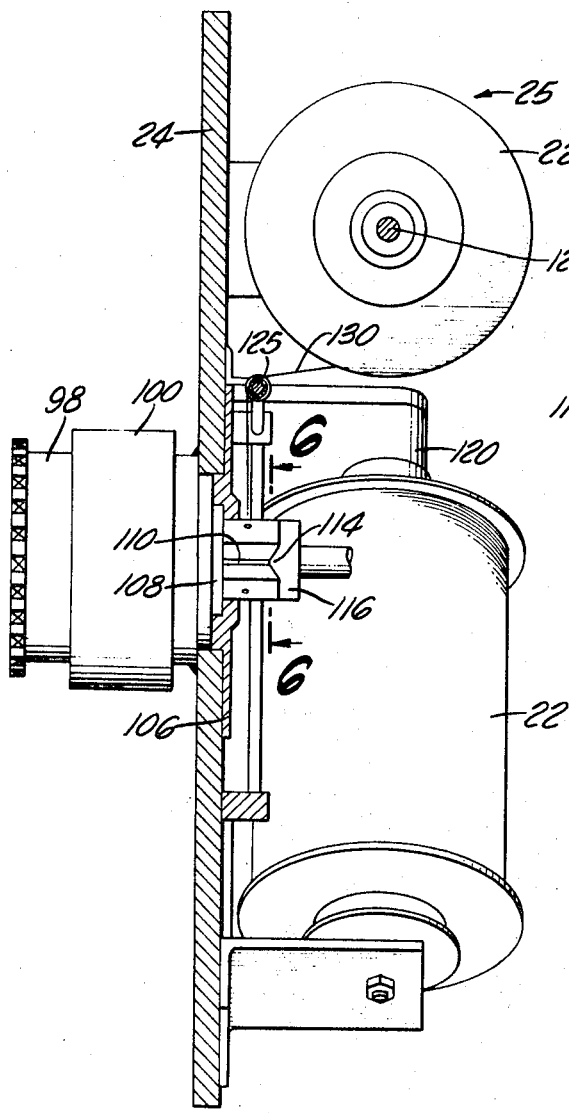
FIG. 5 is a side elevation view partially in section of the circumferential wrapping head shown in FIG. 4 and taken on line 5—5 thereof.
Figure 6:
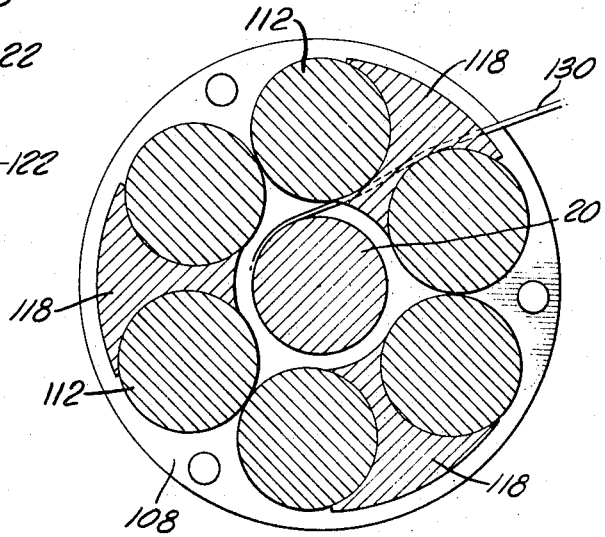
FIG. 6 is a section taken on line 6—6 showing the circumferential wrapping head yarn guide assembly.

The apparatus of the present invention, as shown in FIGS. 1 and 2, is arranged to receive a plurality of filaments or fibers 16 from an upright creel 18 and distribute the filaments 16 circumferentially around an axially stationary mandrel after which the filaments are impregnated with a resinous binding agent in a resin applicator tank 50 and then located on the mandrel. After impregnation and location of the longitudinally extending circumferentially spaced filaments, one or two circumferential layers of fiber are helically wound around the longitudinal filaments which are located around the periphery of mandrel 20, the circumferential layers being fed from spools 22 which are mounted on a single axially rotating plate 24, or two such plates when two circumferential layers are employed. The resin impregnated tubing thus formed is advanced longitudinally (downstream) with a suitable takeoff device, such as the endless belt mechanism 26. The tubing, after receiving the circumferential fiber layers, is advanced through a heating section, for example, through the induction heating coil where the resin is cured, and subsequently the tubing is cooled as with a water jacket 136 to render the tubing less susceptible to deformation.

Referring more particularly now to FIGS. 1–3, a series of fiber spools are vertically spaced in one or more rows with the, additional rows being spaced side by side, on an upright creel 18. Although the spools are mounted in such a manner as to pay out fiber 16, the spools are designed to offer sufficient resistance to the longitudinal fibers 16 to keep the longitudinals taut as they pass through the tube winding apparatus. This braking effect may be accomplished in any convenient manner, for example, by providing a suitable friction breaking device between the spools and the shaft on which they roll. The longitudinal filaments are first fed through a collector plate 32 which is mounted on the machine frame 34. The collector plate has a series of openings 36 through which the longitudinal filaments pass, the openings 36 being circumferentially spaced so that the filaments are distributed around the perimeter of the mandrel 20 which is supported on the machine frame 34 by the collector plate 32. The mandrel may be radially fixed or may be arranged for counter rotation, as shown in FIGS. 2 and 3, and as described in copending application of Glenn G. Havens for "Tube Making Machine and Method," Ser. No. 374,927 filed June 15, 1964, now Pat. No. 3,332,815, as will be hereinafter discussed. Preferably, a rounded polished guide surface or ring 38, as shown in FIG. 3, guides the fiber or filament through the openings 36 to cause a minimum of friction between the ring 38 and the fiber and provide a minimum disturbance to the longitudinal filaments 16.

The mandrel rotation drive is effected with a motor 40 through a suitable gear reduction box 42 and a chain 44 which is attached to a sprocketed spindle 46 to which the mandrel is axially affixed.

The circumferentially distributed longitudinal fibers 16 are then passed through a longitudinally oriented resin tank 50 through which the mandrel passes. The resin tank 50 is mounted on a machine frame cross bar 52 and is longitudinally adjustable thereon. The resin applicator tank, as best shown in FIG. 3, is comprised of a two-part container which is filled with a resinous bonding agent. The tank is provided with guide entry and exit bushing at the respective ends of the tank and an additional spreader guide in the central portion of the tank to prevent misalignment or entanglement of the longitudinal fibers as they pass through the resin. The entry bushing 68 serves to further align and distribute the longitudinal fibers around the mandrel. The container or tank shell is formed by threading a cylindrical portion 53 and a conical portion 54 to a threaded sleeve 56 which is supported on the internal spreader guide 58 which in turn threadably engages threads 60 on central sleeve 61 which is coaxially aligned with mandrel 20, which extends through said sleeve. The spreader 58 has a convex surface 57 over which the fibers pass which causes the fibers to ribbon or flatten out and spread, which not only insures complete impregnation, but also serves to overcome the effect of slight differences in filament length. A cover sleeve 62 is positioned over the two portions 53 and 54 of the resin tank and provides means for turning the conical portion 54 to vary the clearance at the exit. The conical portion 54 advances or retracts on threaded ring 56. The resin tank is initially filled with resin through opening 64 and the container kept full by pumping resin into the tank through a fill tube 66. A spacer 70 is threadably attached to the sleeve 61 and the clearance between the spacer 70 and the entry bushing 68 through which the longitudinal fibers pass may be adjusted by threading the spacer 70 longitudinally along the sleeve through which the mandrel passes. Spacer 70 is set to allow leakage out of the tank 50 between bushing 68 and spacer 70, to provide lubrication for the fibers and permit passage of the yarn through the bushing without damage thereto. The resin overflow from the tank is caught in an overflow container 72 and returned to the resin fill reservoir (not shown) through the overflow drain tube 74.

The sleeve 61 has a thread guide 86 attached thereto near the outlet end of the resin tank. The rubber wiper bushing 78 at the exit end of the resin tank is held in place between the nose 76 of the sleeve 61 and shoulder 80 of the tank conical portion 54. The exit wiper bushing 78 is equipped with a steel insert 82 against which the fibers bear as they leave the resin tank. The clearance between the sleeve nose 76 and the steel insert 82 in the rubber wiper bushing 78 is set to control the amount of resin impregnated into the longitudinal fibers and also to remove excess resin from the longitudinal fibers as they leave resin tank 50.

Spreader guide 58 has circumferentially spaced openings 84 therein through which one or more of the longitudinal fibers may pass. The spreader guide 58 prevents gathering and/or entanglement of the longitudinal fibers as they pass through the resin tank. The number of openings 84 in the spreader guide 58 may be less than the number of openings 36 in the distributor, thus allowing more than one longitudinal fiber to pass through a single opening 84. Similarly, the thread guide 86 has circumferentially spaced holes or openings 88 therein through which the resin impregnated fibers pass.

The circumferential wrapping head 24 is mounted on the machine frame 34 on a cross bar 90, as shown in FIG. 2, and driven with motor 92 through shaft 94 and drive chain 96 which engages a sprocketed bearing spindle 98 which is journeled in a bearing housing 100 which is mounted on a cross bar of the machine frame. Since the desired rotational speed of the circumferential wrapping head 24 is determined by the speed of the endless belt mechanism or takeoff machine 26, a takeoff machine drive may be driven by the wrapping head drive motor 92 through an auxiliary driveshaft 102 and a drive chain 104 with a suitable gear reducer, as will be hereinafter discussed in connection with the takeoff machine.

The tube forming mandrel 20 extends through the circumferential wrapping head 24 and is supported (and driven) independently thereof. The circumferential wrapping head rotates coaxially about the mandrel 20 and no portion of the wrapping head contacts the mandrel. The circumferential wrap head comprises essentially an apertured plate 24 which is affixed to the sprocketed spindle 98 through which the head assembly 25 is journeled in bearing housing 100. An adapter plate 106 is affixed to circular plate 24 and houses a circumferential fiber distributor assembly 108 through which the mandrel 20 extends. Fiber from the spools 22 which are rotatably attached to the circumferential plate 24, is fed through openings 110 between longitudinally oriented pins 112 of the distributor assembly 108 and thence is wrapped circumferentially or helically around the resin impregnated longitudinal fibers as they are advanced along the mandrel by the takeoff machine 26. The movement of the circumferential fiber is restricted axially by rounded guides 114 on a cap member 116. The cap member 116, as shown in FIG. 5, holds the cylindrical pins 112 in place in the distributor assembly 108, thus determining the width of the opening 110 through which the circumferential fiber passes. The distributor assembly 108 has three pin keepers 118 which, together with the rounded guides 114, position the pins 112 in the distributor assembly.

Figure 7:
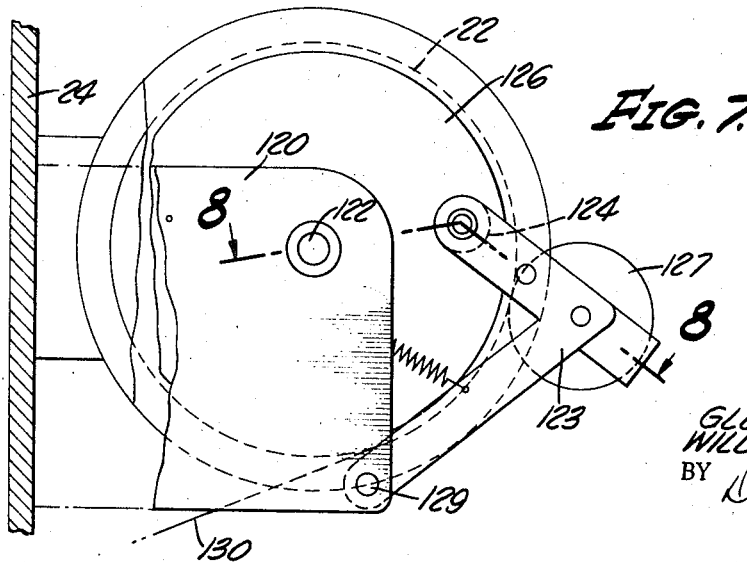
FIG. 7 is a side elevation, partially in section, of a circumferential wrapping head with a circumferential yarn back-tensioning brake device in position on the circumferential spool.

As shown in FIG. 7, spools of fiber 22 are rotatably mounted on plate 24 on supports 120 and roll on shafts 122 as fiber is removed therefrom. The yarn must be back-tensioned in some manner as it is removed from the spool 22 so that it will be taut as it is wrapped around the longitudinal fibers on the mandrel.

Any suitable tensioning means may be utilized such as by inserting an oversized polyurethane sleeve or donut 121 between the support 120 and spool flange surface 126, as shown in FIG. 8a. FIGS. 7 and 8 show a device whereby an adjustable controlled back tension may be maintained on the individual spools and the braking force on the spool is reduced as the diameter of the spool decreases. This device employs a spring loaded follower arm 123, containing a pressure pad 124 and a wheel 127 which rests on the surface of the fiber wound spool. As the fiber is used and the spool diameter decreases, the arm swings about a pivot 129, due to the combined action of the spring tension and centrifugal force, keeping the wheel against the surface of the spool. The pressure pad 124 bears against the face of a flange 126 which rotates with the spool; and, as the arm swings toward the center of rotation of the spool, the pressure pad moves in from the outer edge of the flange causing the braking torque to be reduced in proportion to the reduction in spool diameter.

A tube winding machine has been shown and described with a single circumferential wrapping head. In the preferred embodiment two layers of circumferential fibers are wrapped in opposite directions to provide a balanced laminate construction, although the second circumferential wrapping head has not been shown in order to simplify the drawings and description of the present machine.

Figure 9:
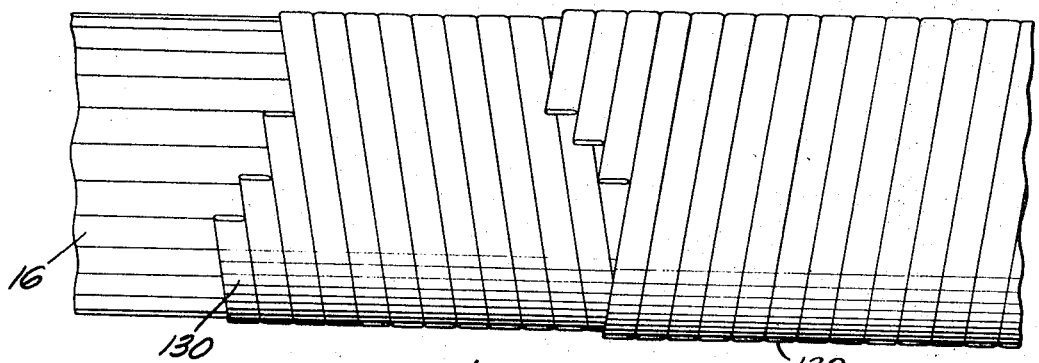
FIG. 9 is an enlarged view of a tube made on an apparatus of our present invention showing a three layer balanced laminate construction.
Figure 10:
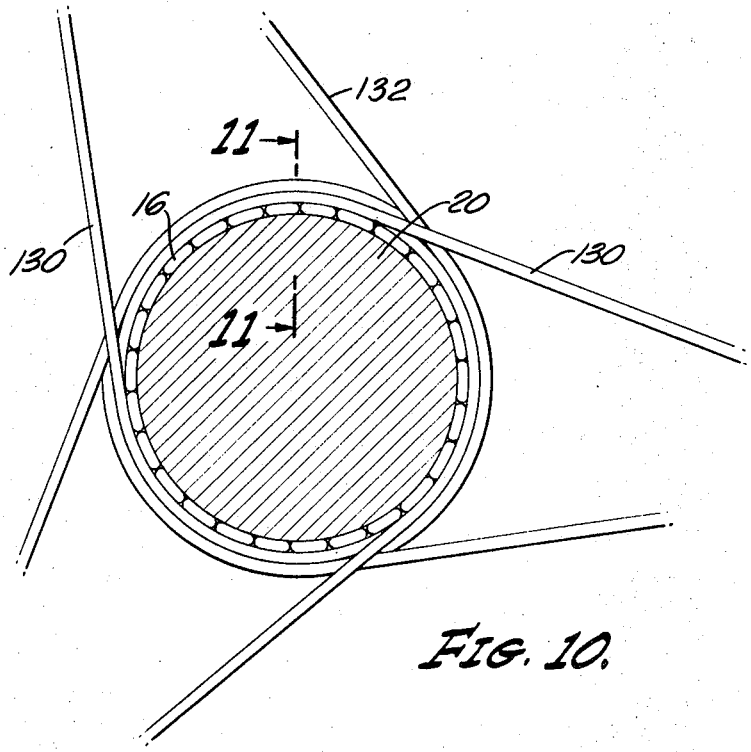
FIG. 10 is an end cross sectional view showing the application of the circumferential layers of yarn to the longitudinal yarn layers.

In the winding head assembly shown, Teflon coated polished copper bars 125 are provided on the circumferential plate 24 to uniformly feed fiber from the spools 22 through the openings 110 between the pins 112 and thence helically onto the longitudinal fiber layer 16, as best shown in FIGS. 9 and 10. The fiber is directed about 90° around the bar over a wheel or pulley 127 which traverses the bar 125 with the fiber as it is removed from the spool.

As shown in FIG. 9, the circumferential fiber 130 is helically wrapped around the longitudinal fibers 16 at an angle determined by the relative speed of the takeoff machine 26 and the rotational speed of the circumferential wrapping head. Preferably, the angle at which the circumferential fibers are wound may be varied from a helix of 85° (relative to longitudinal axis) to 55°, depending on the type of circumferential material and the number of strands used. FIG. 9 shows a second layer of yarn 132 which is wrapped in a direction opposite to the first circumferential layer 130.

In FIG. 10 the relative positions of the two circumferential layers are shown diagrammatically as they are being wrapped in opposite directions on the layer of longitudinal fibers pulled along the mandrel 20.

Figure 11:
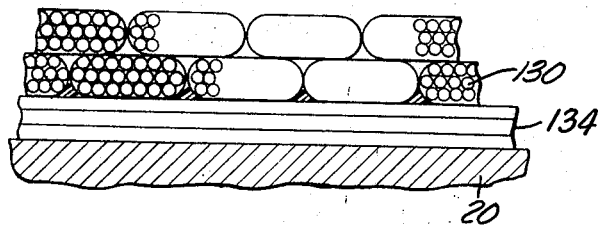
FIG. 11 is an enlarged sectional view of the tube structure of FIG. 10 taken on line 11—11.

FIG. 11 shows a cross section of the tube formed on the mandrel 20 and shows the circumferential layer as being composed of a plurality of fibers 134. The balanced laminate construction using two layers of circumferential fiber wound in opposite directions gives optimum bursting strength and balances the forces or tendency of the circumferential layer to unwind, which forces, if unbalanced, tend to result in the concentration of high stress at the tube end connection (not shown).

The resin binder or impregnant is continually cured by applying heat to the resin impregnated tube as it is pulled along the axially stationary mandrel by any suitable means, for example, by induction heating, dielectric heating, heated ovens, etc. The curing temperature is determined by the rate of production and the curing characteristics of the particular resinous binder, which characteristics are well known to those skilled in the resin art. Generally speaking, however, the higher the curing temperature, the shorter the curing time required. Thus, a rather broad range of temperatures can be used to effect an equally complete cure. In the apparatus shown, a radio frequency generator is utilized to pass a high frequency current through the induction coil 28 which induces a current in the mandrel 20, preferably formed of a ferromagnetic material, to generate a relatively high temperature curing condition. Thus, induction heating results in the application of heat from the inside of the tube which tends to vaporize the resin solvent or blowing agents which is believed to enhance the porosity of the tube as the gas escapes outwardly from internal portions of the tube.

In general, a blowing agent, as described more fully in U.S. Pat. No. 3,457,170, can be considered any source of gas which is liberated during curing of the resin to produce voids in the resin impregnated tube as it escapes from the resin to the atmosphere. The gas may be liberated as a result of vaporization of a solvent, the resin itself, or by-products of the polymerization reaction. Blowing agents which produce gas may also include chemicals within the resin mixture which will react to form a gas.

A post-heat treatment can be utilized advantageously to complete the cure on tubing which may be only partially cured by the initial heat treatment. The post-heat treatment may also be accomplished with an induction heating coil 29 downstream from the primary curing induction coil 28.

A water cooling jacket 136 may be utilized to cool the tube so that the takeoff machine endless belts 26 will not be subjected to the residual heat of the tube after cooling. The cooling of the tube at this point not only improves the rigidity of the tubing, but also reduces the tendency of the take-off machine to deform the diameter of the tubing. Drain pan 138 is provided below the tube in the heating zone to collect any resinous material dripping from the tube.

It has been found that an increased yield is obtained when the tubes are used for solvent separation with a semipermeable membrane coated on the inside of the tube, by subjecting the tube prior to coating with the membrane to an additional heat treatment. This heat treatment may be accomplished by passing the tube over a mandrel under an induction heating coil. To effect heating to a relatively high temperature for a relatively short time, it is theorized that this additional heat treatment breaks up a resin skin which ends to form on the inside of the tube during the cure. The breaking up of this resin skin results in an increase in porosity of the tube, thus resulting in a higher yield when the tube is subsequently used for solvent separation.

As previously stated, the mandrel may be counter rotated in order to overcome the tendency of the longitudinal fiber layers or pullers to be twisted or turned when the circumferential layer is wound on the tube. The counter rotation of the mandrel compensates for this tendency of the longitudinal fibers to be twisted or transversely turned. The rotation of the mandrel should be in the direction opposite to the direction of the first circumferential layer and is affected by the mandrel drive motor 40 and the gear reduction box 42.

FIG. 12 shows a modified resin applicator wherein groups of the longitudinal fibers are passed through tubes 140 through which liquid resin is passed from the resin reservoir 142. Resin is passed into the resin reservoir through fill tubes 144 and 146. The resin dripping from the ends 148 of the tubes 144 is caught in the drain pan 150. A wiper bushing 154 is positioned at the downstream side of the resin reservoir 142 to wipe off excess resin from the longitudinal fibers as they move axially along the mandrel. A mandrel sleeve 156 is provided in the opening of the resin reservoir 142 around the mandrel with a seal ring 158 provided to prevent resin leakage around the mandrel. The forward end of the sleeve 156 is a rounded surface 160 which, together with the steel insert 162 of the wiper plug 154, directs the longitudinal fibers circumferentially around the mandrel 20.

The mandrel 20 of our present invention, as previously mentioned, is supported from one end and extends past the heating zone. In the heat zone the mandrel must be of a ferromagnetic material so that a high temperature can be generated therein by inducing an electrical current in the mandrel. It has been found desirable to use a hardened, thinly chrome plated mandrel in the heating zone to reduce mandrel wear. The mandrel may also be formed in three sections, that is, a first steel "upstream" section, a center section around which section the circumferential wrapping is accomplished, and a downstream section made of steel and which begins at the upstream end of the induction coil. All three sections of the mandrel are preferably solidly joined together and highly polished. A suitable lubricant may also be injected axially through the mandrel and passed outward radially in the "sticking" zone to prevent sticking. The silicone oil can be passed outwardly through a sintered bronze sleeve 170 fitted on an inner perforate ring which surrounds the mandrel as shown in FIG. 13, thus providing for uniform distribution of the lubricant around the periphery of the mandrel. The mandrel may also be provided with Teflon sleeves under the induction heating coils where relatively low curing temperatures are involved, to prevent sticking between the resin impregnated tube and the mandrel.

Although the present invention has been described with a certain degree of particularity, it is to be understood that our invention is not to be limited to the details set forth but should be afforded the full scope of the appended claim.

We claim:
1. An apparatus for continuously forming an elongated tubular member, comprising in combination:
   elongated cylindrical mandrel means including ferromagnetic sections;
   guide means for directing a plurality of fibers onto said mandrel means;
   means for impregnating said fibers with a thermosetting resin;
   heating means located adjacent said ferromagnetic sections and operative thereon to raise the temperature of the resin impregnating said fibers overlying said ferromagnetic sections for curing said resin to structurally integrate said fibers into a continuous tubular member and to raise the temperature of said continuous tubular member overlying said ferromagnetic sections sufficiently rapidly to forcibly drive blowing agents liberated during the cure of the resin in said tubular member through said tubular member and thereby form a multiplicity of pores through said tubular member, said heating means including first induction heating means located adjacent a first one of said ferromagnetic sections and second induction heating means located adjacent a second one of said ferromagnetic sections; and
   takeoff means for continuously pulling said continuous member off said mandrel means and thereby continuously advancing said fibers along said mandrel means.

References Cited

UNITED STATES PATENTS

| | | | |
|---|---|---|---|
| 3,216,876 | 11/1965 | Tyhurst | 156—173 |
| 3,332,815 | 7/1967 | Havens | 156—175 |

PHILIP DIER, Primary Examiner

U.S. Cl. X.R.

156—380, 441, 175, 272